United States Patent [19]

Sammells

[11] Patent Number: 4,803,134
[45] Date of Patent: Feb. 7, 1989

[54] HIGH ENERGY DENSITY LITHIUM-OXYGEN SECONDARY BATTERY

[75] Inventor: Anthony F. Sammells, Naperville, Ill.

[73] Assignee: Eltron Research, Inc., Aurora, Ill.

[21] Appl. No.: 65,967

[22] Filed: Jun. 24, 1987

[51] Int. Cl.[4] .................. H01M 8/14; H01M 4/00; H01M 4/36

[52] U.S. Cl. ........................ 429/16; 429/27; 429/30; 429/103; 429/193

[58] Field of Search ............... 429/16, 27, 30, 101, 429/103, 191, 193

[56] References Cited

U.S. PATENT DOCUMENTS

| | | | |
|---|---|---|---|
| 3,573,107 | 3/1971 | Paris et al. | 429/193 |
| 3,989,538 | 1/1976 | Roth et al. | 429/101 |
| 4,328,291 | 5/1982 | Wimsel | 429/27 X |
| 4,554,222 | 11/1985 | Zaromb | 429/27 X |

OTHER PUBLICATIONS

D. K. Hohnke, "Ionic Conduction in Doped Zirconia", *Fast Ion Transport in Solids*, Vashishta, Mundy, Shenoy, eds., 1979.

O. Yamamoto, Y. Takeda, R. Kanno and M. Noda, "Perovskite-Type Oxides as Oxygen Electrodes for High Temperature Oxide Fuel Cells", Solid State Ionics, vol. 22, p. 241 (1987).

Primary Examiner—Brian E. Hearn
Assistant Examiner—Stephen J. Kalafut
Attorney, Agent, or Firm—Thomas W. Speckman; Ann W. Speckman

[57] ABSTRACT

A high energy density lithium-oxygen secondary cell comprising a lithium-containing negative electrode in contact with a lithium ion conducting molten salt electrolyte separated from the positive electrode by an oxygen ion conducting solid electrolyte. Upon electrochemical cell charging, unit activity lithium is deposited at the interface of the negative electrode with the molten salt electrolyte and oxygen gas is evolved at the positive electrode.

20 Claims, 1 Drawing Sheet

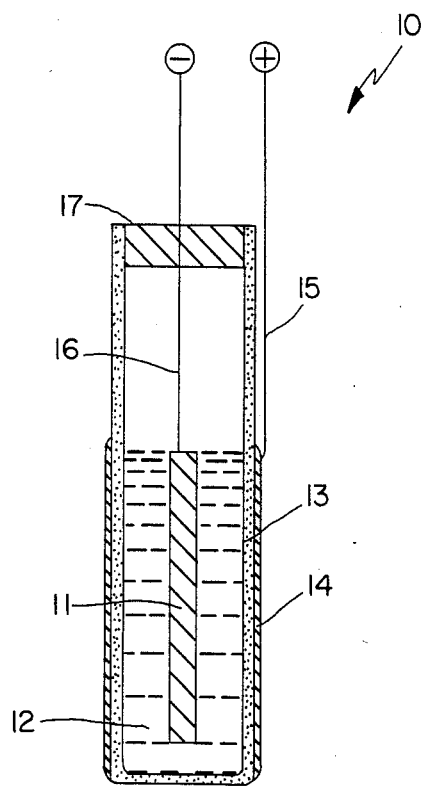

HIGH ENERGY DENSITY LITHIUM-OXYGEN SECONDARY BATTERY

This invention was made as a result of work under Lyndon B. Johnson Space Center Contract No. NAS 9-17743 awarded by the National Aeronautics and Space Administration. The government has certain rights in this invention.

BACKGROUND OF THE INVENTION

The present invention relates to a lithium-oxygen secondary battery comprising a lithium-containing negative electrode in contact with a lithium ion conducting molten salt electrolyte and an oxygen positive electrode, wherein an oxygen ion conducting solid electrolyte effectively separates the respective half-cell reactions. Upon electrochemical charge, lithium is deposited at the negative electrode/molten salt electrolyte interface and oxygen gas is evolved simultaneously at the positive electrode.

In theory, the lithium-oxygen couple should provide an electrolytic cell having one of the highest energy densities yet investigated for advanced battery systems. It has not been possible previously to achieve high electrochemical reversibility at both electrodes under cell operating conditions providing reasonable cell efficiency and cell lifetimes.

SUMMARY OF THE INVENTION

It is an object of the present invention to provide a high energy density electrochemical secondary cell utilizing the lithium-oxygen couple.

It is yet another object of the present invention to provide a high energy density lithium-oxygen secondary cell which exhibits high electrochemical reversibility at both electrodes and provides effective separation of the respective half-cell reactions.

The high energy density lithium-oxygen secondary cell of the present invention comprises a lithium containing negative electrode in contact with a lithium ion conducting molten salt electrolyte for conducting the lithium metal redox half-cell reaction during electrochemical charge and discharge, respectively. The overall electrochemical reaction taking place upon discharge is $FeSi_2Li_x + O_2 \rightarrow Li_2O + FeSi_2$, and the overall electrochemical reaction taking place upon charge is: $Li_2O + FeSi_2 \rightarrow FeSi_2Li_x + O_2$, where the negative electrode comprises lithiated iron silicide formed during electrochemical charge. The molten salt electrolyte is contained and the respective half-cell reactions are separated by an oxygen vacancy conducting solid electrolyte in contact with the positive electrode, where oxygen gas is evolved upon electrochemical charge and is reduced upon cell discharge.

The negative electrode preferably comprises a lithium alloy such as lithiated iron silicide ($Li_xFeSi_2$), lithiated silicon ($Li_xSi$), lithiated aluminum ($Li_xAl$), and other lithium alloys that may be used for lithium storage during cell charge. Lithium deposition onto iron silicide negative electrodes during cell charge is facilitated by the formation of lithiated ferrous silicides on the surface of the negative electrode. Experimental research indicates that a series of lithiated compounds, including $SiLi_2$, $SiLi_3$, $SiLi_4$ and $SiLi_5$, and lithiated ferrous silicides, including $FeSi_2Li_4$, $FeSi_2Li_6$, $FeSi_2Li_8$, and $FeSi_2Li_{10}$ may be formed at the negative electrode to produce the electroactive material comprising $FeSi_2$. $Li_{10}$ or $SiLi_5$ which has an equilibrium potential about 50 mV positive of unit activity lithium. Passage of further current through the cell upon electrochemical charge results in deposition of molten unit activity lithium at the interface of the negative electrode with the molten salt electrolyte.

According to the present invention, the lithium ion conducting molten salt electrolyte is contained and separated from the oxygen electrode by an oxygen ion conducting solid electrolyte. Suitable solid electrolytes, such as zirconia ($ZrO_2$) based solid electrolytes stabilized by the introduction of lower valence metal ions, have a high $O^{-2}$ conductivity at the high operating temperatures of the secondary cell. Suitable oxygen evolving and reducing positive electrode materials must be stable in the strongly oxidizing environment and at high temperatures and provide effective electronic conduction. Electrodes comprising perovskite-type compounds and similar materials are suitable for use with the present invention. Suitable current collectors may also be provided, as is known in the art.

The high energy density secondary cell of the present invention is preferably operated at substantially atmospheric pressures. Cell capacity is determined by the quantity of $Li_2O$ which can be effectively accommodated in the molten salt electrolyte. Suitable operating temperatures for the electrolytic cell depend upon the melting point of the molten salt electrolyte and the conductivity of the oxygen ion conducting solid electrolyte, and preferably range from about 500° to 900° C., most preferably from about 700° to about 750° C. Maintenance of the high temperatures required for operation may be provided by known muffle furnace techniques.

BRIEF DESCRIPTION OF THE DRAWINGS

Further features of the invention will be apparent from the following more detailed description taken in conjunction with the schematic drawing of a high energy density secondary cell configuration suitable for utilizing the lithium-oxygen couple in accordance with the present invention.

DESCRIPTION OF PREFERRED EMBODIMENTS

As shown schematically in the drawing, high energy density secondary cell 10 comprises negative electrode 11, lithium ion conducting molten salt electrolyte 12, oxygen ion conducting solid electrolyte 13, and oxygen redox positive electrode 14. Positive electrode current collector 15 and negative electrode current collector 16 may also be provided in contact with their respective electrodes. Sealing element 17 seals the negative electrode compartment from the atmosphere and preferably maintains constant, substantially atmospheric pressure within the negative electrode compartment.

Suitable negative electrodes 11 for use in the present invention comprise lithium alloys capable of providing lithium storage during cell charge. Negative electrode materials preferably comprise lithiated silicon ($Li_2Si$), lithiated aluminum ($Li_xAl$), lithiated iron silicide ($Li_xFeSi_2$) and other lithium alloys. Negative electrode 11 is preferably from about 5% to about 70% porous, with the electroactive material contained within the pore structure. Negative electrode current collector 16 may comprise low carbon 1010 steel, all stainless steels, Cr, Mn, Ni, Cu, and other electronically conductive metal alloys. Negative electrode 11 is in contact with molten salt electrolyte 12, and is preferably immersed in molten salt electrolyte 12.

Lithium ion conducting molten salt electrolyte 12 preferably comprises LiF-LiCl-Li$_2$O, or any other molten salts in which Li$_2$O is soluble. A preferred lithium ion conducting molten salt electrolyte comprises at least about 20 m/o Li$_2$O. Molten salt electrolytes having low melting points of less than about 1000° C. and preferably from about 400° C. to about 900° C., and high lithium ion conductivity are suitable. Molten salt electrolyte having an initial composition of LiCl(52.5m/o)-LiF(23.6m/o) Li$_2$O(23.9 m/o) is especially preferred.

Molten salt electrolyte 12 is contained by oxygen ion conducting solid electrolyte 13 having a high O$^{2-}$ conductivity at the secondary cell operating temperatures. suitable oxygen ion conducting solid electrolytes may comprise the following compounds: Binary ZrO$_2$ based materials having the general formulas Zr$_{1-x}$M$^{2+}$O$_{2-x}$ and Zr$_{1-x}$M$^{3+}$O$_{2-x/2}$, and ternary ZrO$_2$ based materials such as ZrO-Y$_2$O$_3$-Ta$_2$O$_5$, ZrO$_2$-Yb$_2$O$_3$-MO$_2$, and the like, where M=Ca, Mg, Y, La, Nd, Sm, Gd, Yb, Lu, Sc, Ho, and other materials having similar physical and chemical properties, and M comprises about 5 m/o to about 20 m/o; ThO$_2$ based materials having the general formulas Th$_{1-x}$M$^{2+}$O$_{2-x}$ and Th$_{1-x}$M$^{3+}$O$_{2-x/2}$, where M=Ca, Y, Yb, Gd, La, and other materials having similar physical and chemical properties, and M comprises about 5 m/o to 25 m/o; CeO$_2$ based materials having the general formulas Ce$_{1-x}$M$^{2+}$O$_{2-x}$ and Ce$_{1-x}$M$^{3+}$O$_{2-x/2}$, where M=Ca, Sr, Y, La, Nb, Sm, Eu, Gd, Dy, Ho, Er, Yb, and other materials having similar physical and chemical properties, and M comprises about 5 m/o to 20 m/o; δ-Bi$_2$O$_5$ based materials having the general formulas Bi$_{2-x}$M$^{2+}$O$_{3-x/2}$; Bi$_{2-x}$M$^{6+}$O$_{3-x/2}$; and Bi$_{2-x}$M$_x$$^{3+}$O$_3$, where M=Ca, Sr, W, Y, Gd, Dy, Er, Yb, Mo, Cr, V, Nb, and other materials having similar physical and chemical properties, and M comprises about 5 m/o to 35 m/o; HfO$_2$ based systems having the general formulas Hf$_{1-x}$M$^{2+}$O$_{2-x}$ and Hf$_{1-x}$M$^{3+}$O$_{2-x/2}$, where M=Ca, Sr, Y, and other materials having similar physical and chemical properties, and M comprises about 5 m/o to 35 m/o. Some suitable oxygen ion conducting solid electrolytes and their conductivities are as follows:

Oxygen ion conducting solid electrolyte 13 is in contact with positive electrode 14, where oxygen gas evolution occurs upon electrochemical charge and oxygen gas is reduced upon electrochemical discharge. Positive electrode 14 may comprise the following materials: perovskite-type materials having the general formula LnMO$_3$, where Ln=La or Pr, and M=Co, Ni, or Mn; compounds having the general formula La$_{1-x}$-Ma$_x$MbO$_3$, where Ma=Sr, Ca, K or Pr and Mb=Cr, Mn, Fe, Co or Ba and x is from about 0.2 to 0.01; compounds having the general formula LaMO$_3$, where M=Ni, Co, Mn, Fe or V; and platinum. Positive electrode 14 preferably comprises a thin electrode layer deposited on the outer surface of oxygen vacancy conducting solid electrolyte 13. Suitably thin layers of this material may be provided by techniques such as plasma spraying or slurry coating followed by sintering. Positive electrode current collector 15 is preferably provided to collect current from positive electrode 14, and may comprise platinum or other materials having high electronic conductivity and stability at the high cell operating temperatures. Positive electrode 14 may be exposed to the atmosphere, as shown in the figure, or the cell assembly may be enclosed in a cell container with suitable provision made for supplying oxygen containing gas to the positive electrode.

One especially preferred cell configuration according to this invention is provided with a lithium alloy negative electrode immersed in molten salt electrolyte comprising LiF-LiCl-Li$_2$O, the molten salt electrolyte contained by an oxygen ion conducting solid electrolyte comprising yttria stabilized zirconia, with a thin positive electrode for oxygen evolution and reduction comprising La$_{0.89}$Sr$_{0.10}$MnO$_3$ deposited on the outer surface of the solid electrolyte, and a platinum current collector contacting the positive electrode.

High energy density lithium-oxygen secondary cell 10 is illustrated in a tubular cell configuration, but the cell of the present invention may be conformed to other battery geometries such as prismatic or bipolar. Cell operating temperatures of from about 500° to about 900° C. are preferred, and operating temperatures of about 700° to about 750° C. are especially preferred. Maintenance of the high cell operating temperatures may be achieved by means known to the art, such as muffle furnaces.

The following example sets forth specific cell components and their methods of manufacture and specific cell configurations for the purpose of more fully understanding preferred embodiments of the present invention and is not intended to limit the invention in any way.

EXAMPLE

A cell of the type shown in FIG. 1 was assembled by initially depositing the oxygen evolving and reducing positive electrode as a 5 w/o suspension of La(C$_2$H$_3$O$_2$), SrCO$_3$ and MnCO$_3$ in ethylene glycol/citric acid having the appropriate composition to produce a positive electrode comprising La$_{0.89}$Sr$_{0.10}$MnO$_3$ onto the outer surface of a calcia or yttria stabilized zirconia tube having the compositions CaO(5 w/o)ZrO$_2$ or Y$_2$O$_3$(8 m/o)ZrO$_2$ with the dimensions 600 mm in length, 5 mm inner diameter and 8 mm outer diameter. A 0.25 mm platinum wire current collector was initially tightly coiled in this region. Decomposition of the electrocatalyst precursor was achieved by heating the tube assembly at 800° C. in air for one hour. This procedure was repeated three times, after which the positive electrode half cell assembly was heated to 1250° C. for one hour to optimize the La$_{0.89}$Sr$_{0.10}$MnO$_3$ morphology for oxygen evolving and reducing positive electrode. Good adhesion was achieved between the finally sintered positive electrode, the calcia or yttria stabilized zirconia tube and platinum current collector. Molten salt electrolyte had the following initial composition: LiF(23.6 m/o)-LiCl(52.5 m/o)-Li$_2$O(23.9 m/o) and possessed a conductivity of about 5 $\Omega^{-1}$cm$^{-1}$ at 650° C. Current densities (versus the negative electrode) of about 200 mA/cm$^2$ were achieved at cell voltages of about 1.2 V and temperatures of about 650° C. The cell demonstrated good electrochemical reversibility and showed no evidence of performance degradation after over 100 hours of operation.

While in the foregoing specification this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

I claim:

1. A high energy density lithium-oxygen secondary cell comprising a lithium-containing negative electrode; a lithium ion conducting molten salt electrolyte contacting said negative electrode; an oxygen ion conducting solid electrolyte contacting and containing said molten salt electrolyte; and an oxygen redox positive electrode contacting said oxygen ion conducting solid electrolyte.

2. A high energy density lithium-oxygen secondary cell according to claim 1 wherein said negative electrode comprises a lithium alloy.

3. A high energy density lithium-oxygen secondary cell according to claim 2 wherein said negative electrode is selected from the group consisting of: $Li_xSi$; $Li_xAl$; and $Li_xFeSi_2$.

4. A high energy density lithium-oxygen secondary cell according to claim 3 wherein said negative electrode is from about 5% to about 70% porous and has electroactive material comprising $Li_xSi$ or $Li_xSi_2Fe$ contained within the pore structure.

5. A high energy density lithium-oxygen secondary cell according to claim 3 additionally comprising a negative electrode current collector selected from the group consisting of: low carbon 1010 steel; all stainless steels; Cr, Mn; Ni; and Cu.

6. A high energy density lithium-oxygen secondary cell according to claim 3 wherein said lithium ion conducting molten salt electrolyte comprises at least about 20 m/o $Li_2O$.

7. A high energy density lithium-oxygen secondary cell according to claim 6 wherein said lithium ion conducting molten salt electrolyte comprises LiF-LiCl-$Li_2O$.

8. A high energy density lithium-oxygen secondary cell according to claim 6 wherein said oxygen ion conducting solid electrolyte comprises a compound selected from the group consisting of: binary $ZrO_2$ based materials having the general formulas $Zr_{1-x}M^{2+}O_{2-x}$ and $Zr_{1-x}M^{3+}O_{2-x/2}$, and ternary $ZrO_2$ based materials such as $ZrO-Y_2O_3-Ta_2O_5$ and $ZrO_2-Yb_2O_3-MO_2$, where M=Ca, Mg, Y, La, Nd, Sm, Gd, Yb, Lu, Sc or Ho and M comprises about 5 m/o to about 20 m/o; $ThO_2$ based materials having the general formulas $Th_{1-x}M^{2+}O_{2-x}$ and $Th_{1-x}M^{3+}O_{2-x/2}$, where M=Ca, Y, Yb, Gd or La and M comprises about 5 m/o to about 25 m/o; $CeO_2$ based materials having the general formulas $Ce_{1-x}M^{2+}O_{2-x}$ and $Ce_{1-x}M^{3+}O_{2-x/2}$, where M=Ca, Sr, Y, La, Nb, Sm, Eu, Gd, Dy, Ho, Er or Yb and M comprises about 5 m/o to about 20 m/o; $\delta$-$Bi_2O_5$ based materials having the general formulas $Bi_{2-x}M^{2+}O_{3-x/2}$; $Bi_{2-x}M^{6+}O_{3-x/2}$; and $Bi_{2-x}M_x^{3+}O_3$, where M=Ca, Sr, W, Y, Gd, Dy, Er, Yb, Mo, Cr, V or Nb and M comprises about 5 m/o to about 35 m/o; and $HfO_2$ based systems having the general formulas $Hf_{1-x}M^{2+}O_{2-x}$ and $Hf_{1-x}M^{3+}O_{2-x/2}$, where M=Ca, Sr or Y and M comprises about 5 m/o to about 35 m/o.

9. A high energy density lithium-oxygen secondary cell according to claim 8 wherein said oxygen vacancy conducting solid electrolyte comprises a binary $ZrO_2$ based material.

10. A high energy density lithium-oxygen secondary cell according to claim 9 wherein said oxygen ion conducting solid electrolyte comprises calcia or yttria stabilized zirconia.

11. A high energy density lithium-oxygen secondary cell according to claim 8 wherein said positive electrode comprises a material selected from the group consisting of: perovskite-type materials having the general formula $LnMO_3$, where Ln=La or Pr, and M=Co, Ni, or Mn; compounds having the general formula $La_{1-x}Ma_xMbO_3$, where Ma=Sr, Ca, K or Pr; Mb=Cr, Mn, Fe, Co or Ba; and M comprises about 0.2 to about 0.01; compounds having the general formula $LaMO_3$, where M=Ni, Co, Mn, Fe or V; and platinum.

12. A high energy density lithium-oxygen secondary cell according to claim 11 wherein said positive electrode comprises $La_{0.89}Sr_{0.10}MnO_3$.

13. A high temperature electrolytic cell according to claim 11 additionally comprising a platinum current collector contacting said positive electrode.

14. A high temperature electrolytic cell according to claim 11 additionally comprising a sealing element enclosing and sealing a negative electrode compartment including said negative electrode and said molten salt electrolyte from the atmosphere in an interior volume, and providing maintenance of substantially atmospheric pressures in said interior volume.

15. A high temperature electrolytic cell according to claim 1 wherein said oxygen ion conducting solid electrolyte has a closed-end tubular configuration; said positive electrode is deposited as a thin layer on the outer surface of said oxygen ion conducting solid electrolyte; said molten salt electrolyte is provided in an internal volume of said oxygen ion conducting solid electrolyte; and said negative electrode is immersed in said molten salt electrolyte.

16. A high temperature electrolytic cell according to claim 1 wherein said negative electrode comprises $Li_x$-$FeSi_2$; said molten salt electrolyte comprises LiF-LiCl-$Li_2O$; said oxygen ion conductng solid electrolyte comprises calcia or yttria stabilized zirconia; and said positive electrode comprises $La_{0.89}Sr_{0.10}MnO_3$.

17. A high energy density lithium-oxygen secondary cell according to claim 1 wherein said lithium ion conducting molten salt electrolyte comprises at least about 20 m/o $Li_2O$.

18. A high energy density lithium-oxygen secondary cell according to claim 1 wherein said oxygen ion conducting solid electrolyte comprises a compound selected from the group consisting of: binary $ZrO_2$ based materials having the general formulas $Zr_{1-x}M^{2+}O_{2-x}$ and $Zr_{1-x}M^{3+}O_{2-x/2}$, and ternary $ZrO_2$ based materials such as $ZrO-Y_2O_3-Ta_2O_5$ and $ZrO_2-Yb_2O_3-MO_2$, where M=Ca, Mg, Y, La, Nd, Sm, Gd, Yb, Lu, Sc or Ho and M comprises about 5 m/o to about 20 m/o; $ThO_2$ based materials having the general formulas $Th_{1-x}M^{2+}O_{2-x}$ and $Th_{1-x}M^{3+}O_{2-x/2}$, where M=Ca, Y, Yb, Gd or La and M comprises about 5 m/o to about 25 m/o; $CeO_2$ based materials having the general formulas $Ce_{1-x}M^{2+}O_{2-x}$ and $Ce_{1-x}M^{3+}O_{2-x/2}$, where M=Ca, Sr, Y, La, Nb, Sm, Eu, Gd, Dy, Ho, Er or Yb and M comprises about 5 m/o to about 20 m/o; $\delta$-$Bi_2O_5$ based materials having the general formulas $Bi_{2-x}M^{2+}O_{3-x/2}$; $Bi_{2-x}M^{6+}O_{3-x/2}$; and $Bi_{2-x}M_x^{3+}O_3$, where M=Ca, Sr, W, Y, Gd, Dy, Er, Yb, Mo, Cr, V or Nb and M comprises about 5 m/o to about 35 m/o; and $HfO_2$ based systems having the general formulas $Hf_{1-x}M^{2+}O_{2-x}$ and $Hf_{1-x}M^{3+}O_{2-x/2}$, where M×Ca, Sr or Y and M comprises about 5 m/o to about 35 m/o.

19. A high energy density lithium-oxygen secondary cell according to claim 18 wherein said oxygen ion conducting solid electrolyte comprises calcia or yttria stabilized zirconia.

20. A high energy density lithium-oxygen secondary cell according to claim 1 wherein said positive electrode comprises a material selected from the group consisting of: perovskite-type materials having the general formula $LnMO_3$, where Ln=La or Pr, and M=Co, Ni, or Mn; compounds having the general formula $La_{1-x}Ma_xMbO_3$, where Ma=Sr, Ca, K or Pr; Mb=Cr, Mn, Fe, Co or Ba; and M comprises about 0.2 to about 0.01; compounds having the general formula $LaMO_3$, where M=Ni, Co, Mn, Fe or V; and platinum.

* * * * *